Patented July 3, 1934

1,964,739

UNITED STATES PATENT OFFICE 1,964,739

METHOD OF MANUFACTURING SPONGE RUBBER

Henry R. Minor, Oak Park, Ill., assignor to The Liquid Carbonic Corporation, Chicago, Ill., a corporation of Delaware No Drawing. Application November 28, 1932, Serial No. 644,688

9 Claims. (Cl. 18—53)

The present invention relates to the manufacture of cellular rubber known as sponge rubber, it being an object of the invention to devise a new, more economical and efficient method of making sponge rubber, and to secure a better product in which the cells are of more uniform size and distributed more regularly and more uniformly through the rubber.

It is a well known fact that gases will penetrate through rubber and it is a further well known fact that gases can be forced into rubber to a greater or less degree under pressure. It has not hitherto been known, however, that this could be accomplished when the rubber was in mass nor with low pressure to a sufficient degree nor with sufficient uniformity to utilize this fact for blowing purposes on release of pressure to cause said mass to fill a mold.

The process herein described utilizes the hitherto unrecognized property of rubber in mass to absorb carbon-dioxide gas at relatively low pressures, and the subsequent expansion of the rubber with the formation of the cells when the surrounding pressure is reduced in the manner described. Attempts have been made heretofore to manufacture sponge rubber by subjecting rubber in an unvulcanized condition to the action of inert gases at high pressures, and the theory upon which former workers in the art have proceeded is to subject the rubber compound to gas under high pressure and in the presence of heat. Such efforts have been failures, for there are no commercial or practical applications of the principles attempted by the prior workers in the art.

The success of the within described method of producing sponge rubber is due to the fact that the present inventor has departed in several important and controlling particulars from the practices of the prior art, as will be pointed out more fully as the description of the invention proceeds.

One of the objects of the present invention is to provide a simple and efficient method of making sponge rubber utilizing $CO^2$ gas as the blowing ingredient. By the use of $CO^2$ gas in the manner described, not only is the cellular structure of the sponge rubber superior in regularity of size and distribution of the cells throughout the rubber mass, but the sponge rubber has superior aging qualities over previous sponge rubbers made by known processes. The sponge rubber secured by the use of the process of this invention will keep for substantially longer periods, losing but little of its elasticity and retaining its original volume and shape. The cells are not necessarily broken down or destroyed.

The universal practice for making sponge rubber has been to compound the rubber with some blowing agent which will decompose during the vulcanization. Usually sodium bicarbonate or ammonium bicarbonate have been employed. One of the objections to the processes now employed is that the incorporation of the compounding ingredients requires excessive milling which, by destroying the nerve of the rubber, reduces the tensile of the rubber, and results in very poor aging characteristics. In the process described herein it is not necessary to mill the rubber excessively, and the milling is stopped when the compound reaches its optimum condition for high tensile and superior aging.

The rubber stocks compounded with the usual blowing ingredients must be cured promptly, otherwise the blowing ingredients will be deteriorated by the action of the organic acids which are present in compounded rubber. In the process covered herein the rubber may set for any desirable period before curing. This is advantageous.

In the manufacture of sponge rubber by current practices, the percentage of defective or "seconds" stock is very high owing to the variations in compounding ingredients, their varied distribution or dispersion through the stock, the variation in effect of the organic acids upon the blowing ingredients, and to the many factors which have to be predetermined and controlled. The present process does away with these objectionable features, and will be found to give uniformly better results without unusual precaution in the processing. The process is more fool proof against errors or accidents in the ordinary run of factory operations.

The product secured by the process described herein is noteworthy because of the uniformity in size of the cells throughout thicker pieces of sponge rubber than it has been possible to attain heretofore. It is further noteworthy that in former processes it was essential that the cell structure be broken down immediately upon removal from the curing mold, otherwise the shrinkage thereafter would make the finished product worthless. By the process disclosed herein objectionable shrinkage does not occur.

It has also apparently been substantially impractical heretofore to cure sponge rubber except in platen presses. Sponge rubber made in accordance with the present invention may be cured in any type of vulcanizer. The sponge rubber may by this process be cured in an atmosphere of hot $CO_2$ gas at sufficient pressure, such for example as ten pounds, so as to prevent the loss of pressure of the $CO_2$ gas within the rubber.

It has been suggested heretofore to impregnate rubber with various inert gases, usually nitrogen, at very high pressures, usually about 2,000 pounds. Attempts have been made to impregnate rubber with $CO_2$ gas, but it has apparently been supposed that due to the relatively low pressure of $CO_2$ gas that this gas could not be employed. These prior attempts to impregnate rubber with inert gases have usually been performed while the rubber was heated and in a plastic state.

The present inventor has discovered that rubber may be successfully impregnated and completely permeated by $CO_2$ gas at low pressures, such as are easily and commercially workable, very successful results having been secured with $CO_2$ at as low as 200 pounds pressure, such impregnation being carried on, preferably while the rubber is at normal room temperature. As the pressure is released the rubber expands due to the expansion of the many minute gas cells within the rubber.

This discovery has led to many other discoveries and permutations of the invention, some of which will be noted briefly. By the release of pressure at a predetermined and uniform rate the uniformity and size of the cells is substantially controllable. The degree to which the pressure is released before curing also affects the structure of the sponge rubber, and it is possible by varying the periods, pressures and rates of release to secure all sizes of cells from microscopic cells to cells of the size now usually found in the ordinary bath sponge except as affected by size of original stock placed in mold.

In carrying out the method disclosed and made the subject of this application, the usual or available rubber, such as pale crepe, is compounded with sulphur, any of the usual compounding ingredients, and an accelerator. The character of the accelerator and its behavior during cure is important to the successful carrying out of the process, as will be explained. The rubber is milled sufficiently to secure the proper compounding, but, as stated above, it is preferably stopped when the optimum conditions are arrived at, and before the nerve is destroyed, so that the rubber retains its maximum tensile strength and aging qualities. A small block of the compounded rubber is then placed in a mold, the volume of the rubber being a fractional part of the volume of the mold cavity, so that the rubber will expand in the subsequent operations. The mold is closed around the rubber and $CO_2$ gas is admitted to the interior of the mold at the desired pressure, and while the rubber is at normal temperature. The rubber is allowed to remain in the mold under pressure for a period of time to afford the opportunity for the $CO_2$ gas to penetrate thoroughly and permeate the rubber. For example, I have employed $CO_2$ gas at 200 pounds pressure and have kept a mass of rubber under that pressure for twelve hours. At higher pressures the time may be shortened, and the factors of pressure and time may be governed and determined by the conditions, by the size of the rubber mass to be impregnated, and by other factors as may be developed in commercial adaptations of the process.

In processes of manufacturing sponge rubber heretofore used, the expansion does not take place within a mold until after a curing temperature has been applied with resultant action of the organic acids upon the bicarbonate or the effect of heat on the bicarbonates, causing them to decompose, gas be given off and expansion of the rubber takes place in the mold, whereas in the process described herein, the expansion takes place to fill the mold almost immediately upon the release of pressure and accelerators should be used which will tend to set up or begin to set up immediately, whereas accelerators used in the present method of making sponge are of the delayed type.

After a sufficient interval the pressure is released and the rubber mass will therefore expand to the limits of the mold with the consequent formation of cells within the rubber. The release of pressure should be at a predetermined rate to secure the desired results and should be moderate and uniform. For example, in using pressures of 200 pounds or thereabouts, the pressure should be lowered from 200 pounds to zero in about a minute. It may be advisable not to release the pressure completely, or to atmospheric pressure, but only to release the pressure partially. Certain advantages in stability of the cellular structure of the finished product are secured by releasing the pressure to some intermediate point, for if the sponge rubber is cured with gas within the cells at a sufficiently high pressure the outward diffusion of the gas will equal the inward diffusion of air, and this will prevent shrinkage of the rubber. At low pressures the pressure of gas within the cells is reduced to eight or ten pounds to avoid shrinkage.

After the pressure has been released and the expansion of the rubber secured in any of the ways described above, it is advisable to permit the rubber to stand for an interval, or to give the rubber a rest period before vulcanization, this being found to have beneficial effects upon the finished stock, and improving the aging and tensile characteristics of the cured product. The rubber is now ready for the vulcanization operation, but preparatory to heating the mold to vulcanizing temperature, it should be opened or the pressure released momentarily to permit the escape of any trapped gases on the exterior of the rubber mass.

The sponge rubber is now cured or vulcanized in any known or preferred manner. In connection with the curing it should be observed that the character of the accelerator employed is a considerable factor in the success of the process. The accelerator should not be characterized by delay of its action, but should be one which gives an even and uniform cure throughout the whole process, and in addition it should set the stock up at a relatively low temperature. Of several commercial accelerators on the market at the present time that known by the commercial name of "Captax", which is the trade name for 2-mercaptobenzothiazole, has been found to be suitable, although other accelerators having similar properties and behavior characteristics may be employed. By employing an accelerator of this general type the stock is set up almost immediately so that loss of pressure or breakdown of the cells is avoided. The rubber is preferably compounded and the accelerator chosen so that the rubber will be completely set up, and, therefore, the structural characteristics of the finished product will be fixed at approximately 220° F. Vulcanization is preferably carried on at approximately 260° F.

It will be found that sponge rubber produced by the process herein described will have the advantageous and desirable characteristics outlined above. The remarkable aging qualities, uniform small cell structure and high tensile strength are characteristics of sponge rubber made by this process. The fact that the cells of the sponge rubber are impregnated with $CO^2$ gas adds to the aging qualities of the finished product. The sponge rubber made by the process described herein is substantially free from odor, which differentiates it from prior processes. It is also much lighter in weight than other forms of sponge rubber; in fact, it is as light or lighter than cork, a characteristic which has not been obtainable by prior processes.

It will be apparent that the process having been fully described and disclosed, that variations and modifications may be made within the scope of the invention, and the claims are not to be considered as limited to the details of the process set forth herein but are of sufficient breadth to cover improvements and changes in the details, all within the scope of the basic invention set forth. While $CO^2$ gas has been specifically mentioned, and while this gas has been found to give superior results, in some aspects of the invention other inert gases may be employed.

What is claimed is:

1. The process of manufacturing sponge rubber, comprising subjecting a mass of rubber compounded for vulcanization to carbon dioxide gas at cylinder pressures approximately 850 pounds and in the absence of heat, permitting said mass to remain in the gas until absorption of the gas by the rubber occurs, releasing the pressure at a substantially uniform rate and over a substantial time interval and permitting the rubber mass to expand, and curing the rubber under conditions which set up the rubber quickly.

2. The process of making sponge rubber, comprising compounding a mass of rubber for vulcanization with an accelerator which will cause the rubber to set promptly upon the application of heat, subjecting a body of such rubber compound to the action of carbon dioxide gas at low pressure and for a sufficient period to obtain penetration of the gas within the rubber mass, releasing the pressure and permitting the rubber to expand under the influence of the entrapped gas, and vulcanizing.

3. The process of manufacturing sponge rubber, comprising subjecting a mass of rubber compounded for vulcanization to an inert gas at low pressure in the absence of heat, permitting said mass to stand until the gas is absorbed by the rubber, releasing the pressure over an interval of time sufficient to allow the gas cells pocketed within the rubber to expand uniformly, and vulcanizing.

4. The process of manufacturing sponge rubber, comprising subjecting a mass of rubber compounded for vulcanization to an inert gas at low pressure in the absence of heat, permitting said mass to stand until the gas is absorbed by the rubber, releasing the pressure over an interval of time sufficient to allow the gas cells pocketed within the rubber to expand uniformly, permitting the expanded rubber to stand for a rest interval, and vulcanizing.

5. The process of manufacturing sponge rubber, comprising subjecting a mass of rubber containing an accelerator which will cause the stock to set up quickly and at low temperature, to a surrounding atmosphere of an inert gas at cylinder pressures approximately (850 pounds) or below and for a period sufficient to secure absorption of the gas by the stock, releasing the pressure at a predetermined rate sufficient to secure uniform expansion of the gas cells within the rubber, and vulcanizing the rubber.

6. The process of manufacturing sponge rubber, comprising subjecting a mass of rubber containing an accelerator which will cause the stock to set up quickly and at low temperature, to a surrounding atmosphere of carbon-dioxide gas, at cylinder pressures (850 pounds) or below and for a period sufficient to secure absorption of the gas by the stock, releasing the pressure at a predetermined rate sufficient to secure uniform expansion of the gas cells within the rubber, and vulcanizing the rubber.

7. The process of manufacturing sponge rubber, comprising subjecting a mass of rubber to carbon dioxide gas at low pressures, to wit from 850 to 200 pounds, without heat, and for a sufficient interval of time to secure uniform absorption of the gas by the rubber, permitting the pressure surrounding the rubber to be reduced until the rubber shall have expanded under the influence of the gas cells within the rubber, and vulcanizing.

8. The process of manufacturing sponge rubber, comprising subjecting a mass of rubber to carbon dioxide gas at pressures of 850 pounds or less, without heat, and for a sufficient interval of time to secure absorption of the gas by the rubber, reducing the pressure surrounding the rubber over a sufficient time interval to secure uniform expansion of the gas cells within the rubber, and vulcanizing the rubber so that the cellular structure will be set up in the mass quickly and at a temperature below that of vulcanization.

9. In the process of manufacturing sponge rubber, the step of subjecting a mass of uncured rubber to carbon dioxide gas under pressure for a sufficient period to secure penetration of the gas within the rubber, permitting the rubber to expand by releasing the pressure and controlling the character of the cells within the rubber by the rate of pressure release and the extent thereof.

HENRY R. MINOR.